(12) United States Patent
Kogami

(10) Patent No.: US 7,225,957 B2
(45) Date of Patent: Jun. 5, 2007

(54) CUP HOLDING DEVICE

(75) Inventor: Mitsuru Kogami, Utsunomiya (JP)

(73) Assignee: NIFCO Inc., Yokohama-shi (JP)

( * ) Notice: Subject to any disclaimer, the term of this patent is extended or adjusted under 35 U.S.C. 154(b) by 625 days.

(21) Appl. No.: 10/848,045

(22) Filed: May 19, 2004

(65) Prior Publication Data
US 2005/0000991 A1    Jan. 6, 2005

(30) Foreign Application Priority Data
Jul. 3, 2003    (JP)    ............................. 2003-190899

(51) Int. Cl.
*B60R 7/00*    (2006.01)
(52) U.S. Cl. ..................................... 224/483
(58) Field of Classification Search ..................... None
See application file for complete search history.

(56) References Cited
U.S. PATENT DOCUMENTS 5,379,978 A * 1/1995 Patel et al. .............. 248/311.2
5,628,486 A * 5/1997 Rossman et al. ........ 248/311.2
6,837,471 B2 * 1/2005 Izume ..................... 248/311.2
2004/0021050 A1 * 2/2004 Izume ..................... 248/311.2

FOREIGN PATENT DOCUMENTS
JP    2794389    6/1998

* cited by examiner

Primary Examiner—Stephen J. Castellano
(74) Attorney, Agent, or Firm—Manabu Kanesaka

(57) ABSTRACT

A cup holding device includes a storage case having a front opening; a tray for placing a container movable between a drawn position where the tray is drawn forward from the storage case and a storage position where the tray is stored in the storage case; a holding member attached to the tray for holding the container and movable between a non-usable position where the holding member is retained in the tray and a usable position where the holding member rises above the tray; and a supporting rib. The rib is disposed at a forward end of the tray for supporting a forward end of the holding member when the tray moves forward to the drawn position and the holding member moves to the usable position, and is situated in a space formed in the holding member when the holding member is at the non-usable position.

8 Claims, 7 Drawing Sheets

CUP HOLDING DEVICE

BACKGROUND OF THE INVENTION AND RELATED ART STATEMENT

The present invention relates to a cup holder or cup holding device disposed in a compartment of an automobile or the like and suitable for holding a cup or the like.

FIG. 7 shows a conventional cup holding device disclosed in Japanese Patent No. 2794389. The cup holding device includes a case (retainer) 50 with a front opening; a tray 51 movable between a drawn position and a storage position with respect to the case 50; and a holding member 52 movable between a non-usable position overlapped with the tray 51 and stored in the case 50 and a usable position extending upwardly through a forward movement of the tray 51.

The holding member 52 holds a periphery of a container K placed on the tray 51 through a hole of a holding portion 52a at the usable position. The tray 51 includes a pair of attaching pieces 51a projecting from a bottom surface thereof, and moves with both sides thereof sliding along guiding rails disposed on both inner sides of the case 50. The holding member 52 includes a pair of supporting pieces 52b connected to the holding portion 52a, pins 53 projecting from the supporting pieces 52b, stopping surfaces 52c provided on a lower side of a base end of the supporting pieces 52b, and upper locking portions 52d provided on an upper side of the base ends of the supporting pieces 52b. The holding member 52 is rotatably assembled to the attaching pieces 51a of the tray 51 through the pins 53 and is urged upwardly by a spring member (not shown).

The holding member 52 rotates around the pins 53 and rises obliquely with the urging force when the tray 51 is drawn out from the storage position to the drawn position. In this state, the stopping surfaces 52c abut against the bottom plate of the tray 51 to restrict the excessive rotation of the holding member 52. The locking portions 52d abut against the upper plate of the case 50, so that the holding member 52 does not rotate to the non-usable position even if an improper downward load F is applied to the holding member 52. Incidentally, reference numeral 54 represents a sub-holding member, and when a container has a diameter smaller than that of the hole of the holding portion 52a, the sub-holding member pushes the outer periphery of the container to absorb wobbling.

In the cup holding device as described above, there are the following problems. First, in the device shown in FIG. 7, when the holding member 52 receives the downward load F, the locking portions 52d apply a load to the upper plate of the case 50, so that the device might be damaged. The holding member 52 rotates with respect to the tray 51 around the pins 53 as supporting points, and has the base end side shorter than the holding portion 52a side with the pin 53 as the center. Accordingly, when an article or hand advertently pushes the holding portion 52a from above, due to the action of leverage, an excessive load is applied to the corresponding case portion contacting the locking portion 52d.

Second, in general, a cup holding device preferably has a simple structure and operates smoothly. However, the holding member 52 is urged upwardly with a spring member with the pins 53 as supporting points, and it is necessary to provide the spring member with a considerably large urging force, thereby making it difficult to move smoothly. When the tray 51 moves to the storage portion, the case 50 pushes the holding member 52 to overlap with the tray 51. When the spring member has the large urging force, a large load needs to be applied to the holding member 52 to overlap with the tray 51. Accordingly, it is preferred that the spring member for urging the holding member upwards be omitted, or, at least, have a small urging force. Further, the tray 51 and the holding member 52 are fixed to the tray 51 through the pins 53, thereby restricting the design flexibility.

Third, in the structure, the holding member 52 is lifted upwardly, and the container K is inserted into the hole of the holding portion 52a with the periphery thereof held. It is preferred that the holding member 52 is lifted parallel to the tray 51 as much as possible in view of a stable holding, an appearance or the like. When the device has a structure in which the holding member is vertically moved with respect to the tray through a parallel link, it is difficult to take a countermeasure for the load F described above, and the tray becomes large.

In view of the above problems, it is an object of the invention to provide a cup holding device, wherein even if the downward load is applied to a holding member, the holding member is not improperly shifted to a non-usable position, thereby preventing damage.

Further objects and advantages of the invention will be apparent from the following description of the invention.

SUMMARY OF THE INVENTION

In order to achieve the objects described above, according to a first aspect of the invention, a cup holding device includes a storage case with an opening at a front side thereof; a placing tray movable between a drawn position drawn forward relative to the storage case and a storage position pushed in the storage case; and a periphery holding member connected to the tray and movable between a non-usable position overlapped with the tray and stored in the case and a usable position rising upwardly through a forward movement of the tray. The tray includes a supporting rib disposed at a leading end side thereof in a drawing direction. The supporting rib is positioned in an empty portion provided to the holding member when the holding member is at the non-usable position. The supporting rib holds a corresponding leading end side of the holding member from beneath when the holding member is at the usable position and the tray separately moves to the drawn position.

According to a second aspect of the invention, in the cup holding device according to the first aspect of the invention, a plurality of shaft portions with spaces in the horizontal direction and in the vertical direction therebetween is provided on a rear side of the holding member. A plurality of escape holes including vertical holes and horizontal holes, respectively, for inserting the shaft portions is provided in the tray. A plurality of guiding grooves inclined upwardly toward the front end is provided in the case for inserting the shaft portions to slide therein through the escape holes. The shaft portions slide with respect to the escape holes and guiding grooves, when the tray and the holding member move between the respective positions. After the holding member moves to the usable position, the tray independently moves further forward by a distance corresponding to a length of the horizontal holes to thereby reach the drawn position.

In the device according to the first aspect of the invention, when a container or the like is held, the tray is moved from the storage position to the drawn position. In the process, the holding member is pulled out of the case together with the tray and lifted to the usable position from the non-usable position. The holding member is further moved forward by a predetermined distance to thereby reach the drawn position. After the holding member is shifted to the usable position, the supporting rib on the tray is positioned under a leading end of the holding member without abutting against the holding member through the forward movement of the tray, and receives the corresponding leading end of the holding member from beneath to thereby hold.

According to the first aspect of the invention, the cup device has the structure wherein the holding member is supported on the base end side thereof and rises from the tray to the usable position; in other words, the holding member is held on the one-side thereof at the usable position. Accordingly, even if the holding member receives an excessive downward load on the leading end thereof, the supporting rib prevents the holding member from moving to the non-usable position, thereby eliminating a cause of damage.

In the first aspect of the invention, the holding member may include a rib portion to be supported abutting against the supporting rib and extending downwardly from a location close to the empty portion. In this case, a height of the supporting rib is adjusted according to the rib portion to be supported with respect to the lifted height of the holding member, thereby making it easy to prevent contact between the members.

One of the supporting rib and the rib portion to be supported may be formed in a convex shape, and the other may be formed in a concave shape for receiving the convex portion. In this case, the convex shape engages the concave shape. Accordingly, even if an improper load is applied to the leading end side of the holding member from the right or left side or from the lateral direction thereof, the holding member is securely fixed to the tray, thereby eliminating a cause of damage and improving reliability.

In the second aspect of the invention, the tray is horizontally drawn out from the storage position to the foremost position, i.e. the drawn position, while the shaft portions slide along the guiding grooves in the case. During the horizontal movement, the tray is supported on the shaft portions sliding through the vertical holes of the escape holes in the tray. Also, the tray independently moves forward with respect to the holding member while the shaft portions slide from the upper ends of the vertical holes along the horizontal holes. The holding member is lifted on the base end side thereof according to the shapes of the escape holes and guiding grooves guiding the shaft portions, and is shifted to the usable position in a state substantially parallel to the tray. At the usable position, the plural shaft portions are fitted into the lateral holes of the tray as described above, thereby maintaining the substantially parallel state.

The holding member is lifted for a length determined by the height of the upward inclined portions of the guiding grooves at the terminal ends thereof and the length of the vertical holes of the escape holes. Therefore, in the structure, the tray is independently moved in the front to rear direction with respect to the holding member corresponding to the length of the horizontal holes of the escape holes, thereby improving design flexibility. As a result, it is possible to make the tray small without impairing the holding characteristic and the appearance of the cup holding device. It is also possible to hold and lift the holding member in the substantially horizontal state with respect to the tray, thereby improving the holding characteristic. The holding member is lifted according to the shapes of the escape holes and guiding grooves guiding the shaft portions. Accordingly, a spring member in the conventional cup holding device may be omitted, or it is possible to reduce an urging force of the urging member, thereby simplifying and improving the operation.

BRIEF DESCRIPTION OF THE DRAWINGS

FIGS. 3(a) to 3(c) are views showing the cup holding member, wherein FIG. 3(a) is a plan view of a case thereof, FIG. 3(b) is a plan view of a tray thereof, and FIG. 3(c) is a side view of the tray;

FIGS. 4(a) to 4(c) are views showing a detailed structure of the cup holder device, wherein FIG. 4(a) is a plan view of a holding member thereof, FIG. 4(b) is a side view of the holding member, and FIG. 4(c) is a sectional view taken along line 4(c)-4(c) in FIG. 4(a);

FIGS. 5(a) and 5(b) are views showing a rib and a rib portion to be supported, wherein FIG. 5(a) is a partially exploded perspective view showing the rib formed on the tray and the rib portion to be supported formed on the holding member, and FIG. 5(b) is a partial perspective view showing a state where the rib engages the rib portion to be supported;

FIGS. 6(a) to 6(c) are partial sectional views of the cup holding device, wherein FIG. 6(a) shows the tray and the holding member in a stored position, FIG. 6(b) shows the tray and the holding member on the way to a drawn position, and FIG. 6(c) shows the tray and the holding member in the drawn position.

DETAILED DESCRIPTION OF PREFERRED EMBODIMENTS

Figure 1:
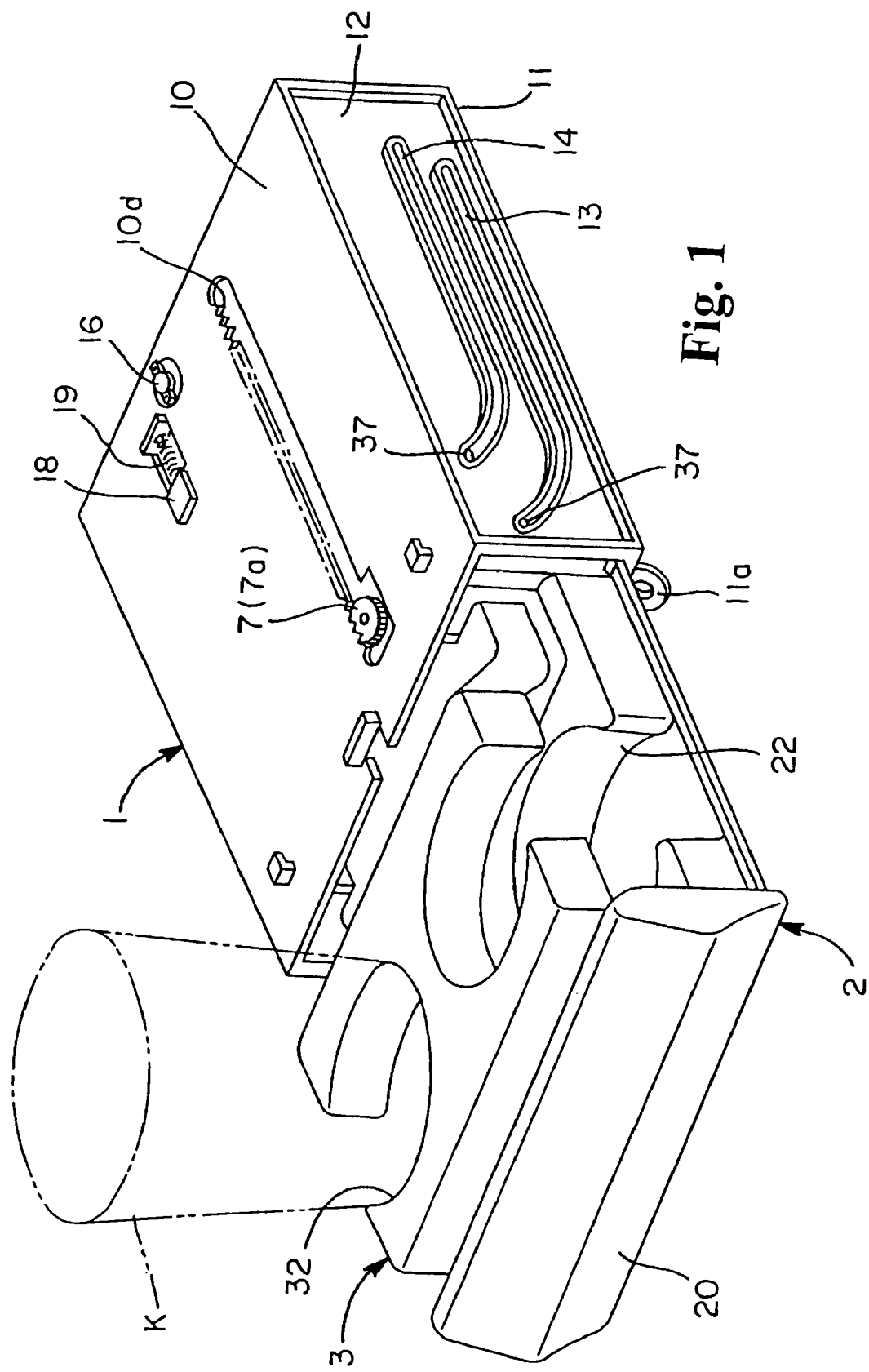
FIG. 1 is a perspective view showing a cup holding device according to an embodiment of the invention.
Figure 2:
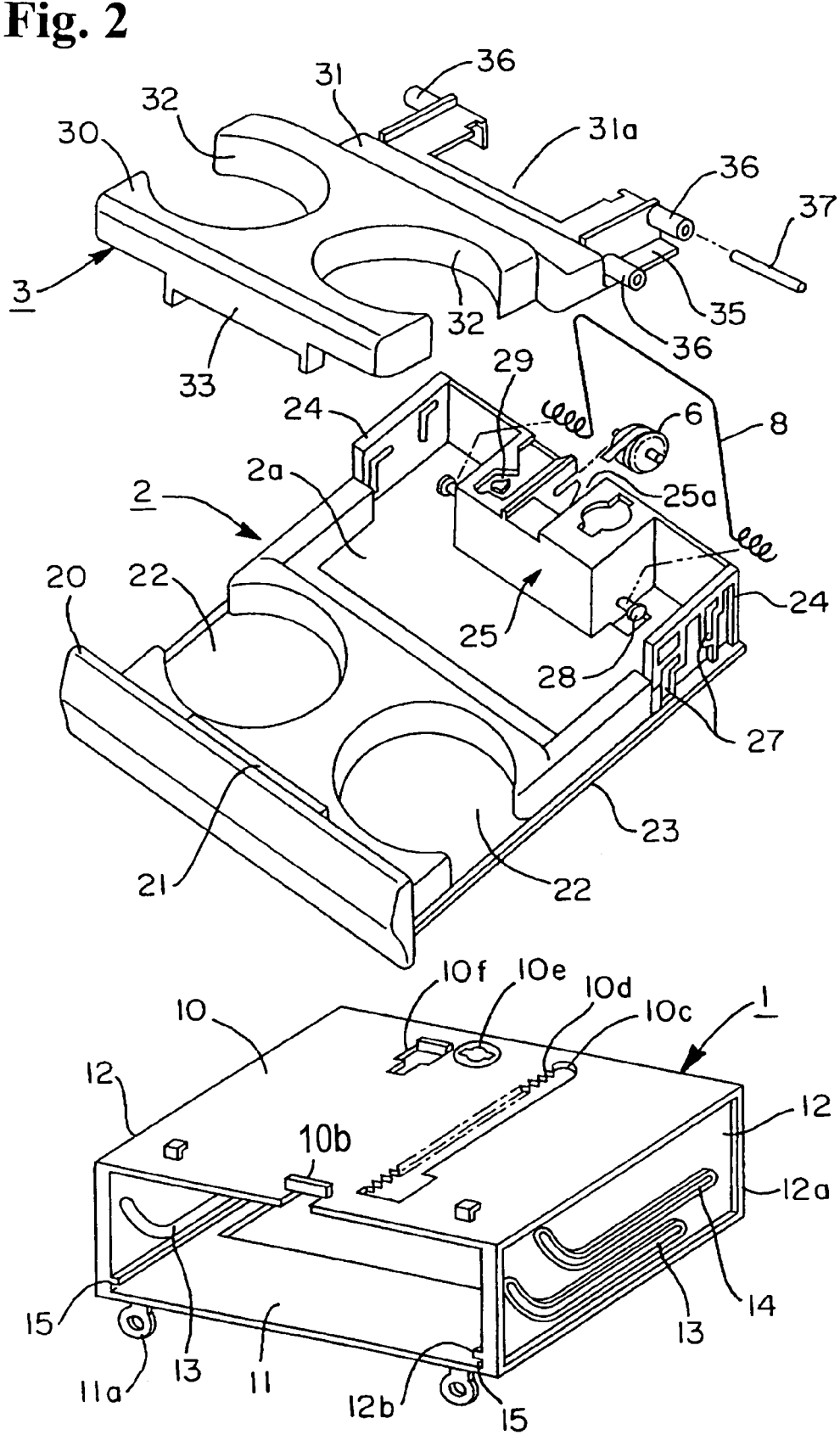
FIG. 2 is an exploded perspective view showing respective members of the cup holding device.
Figures 3A, 3B, 3C:
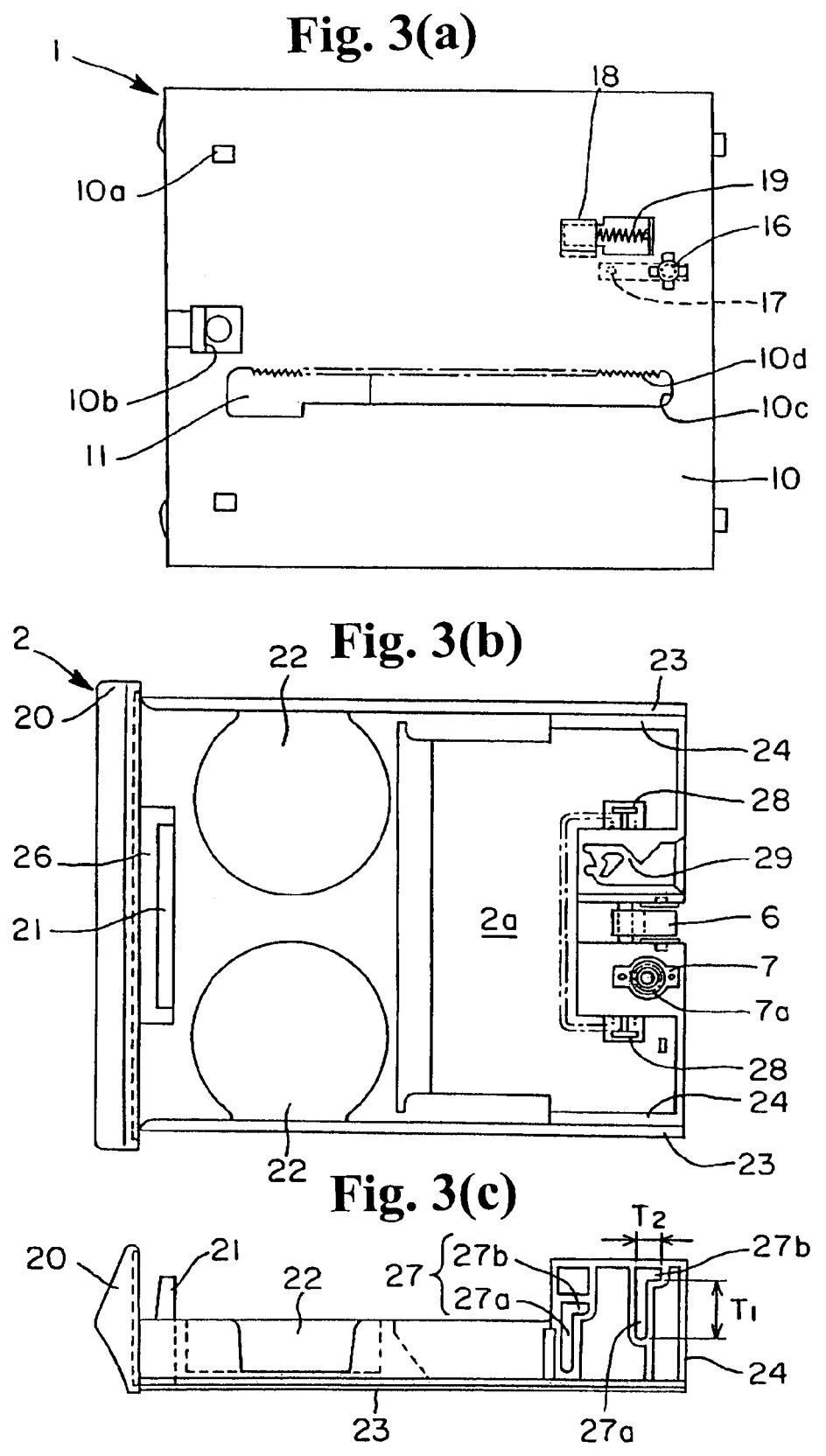
Figure 4A:
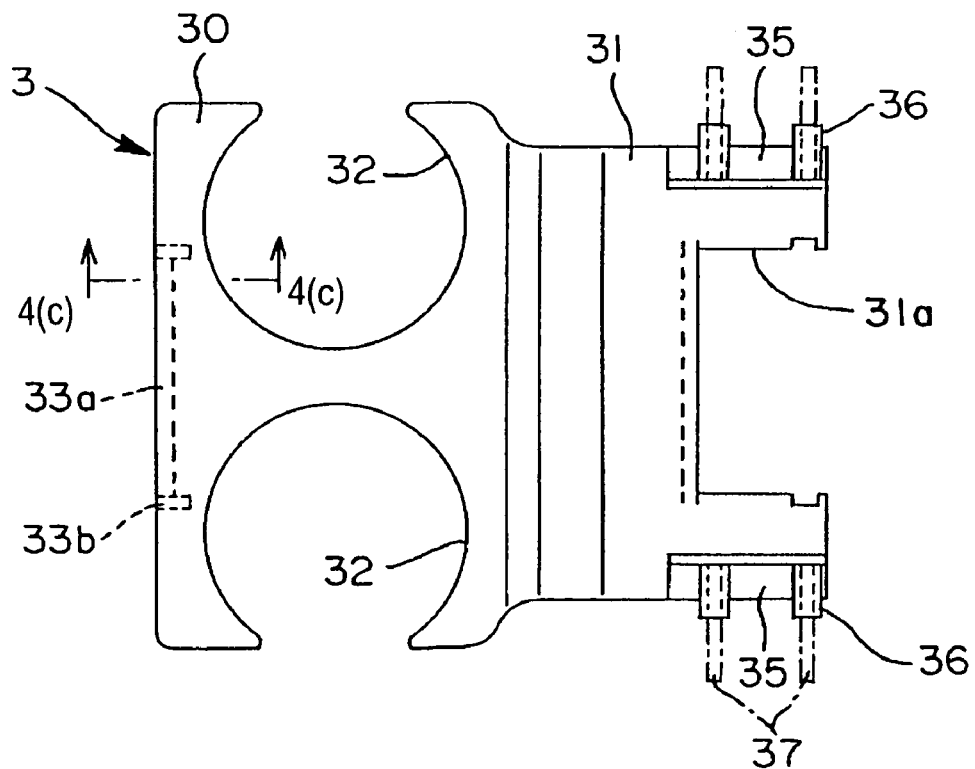
Figure 4B:
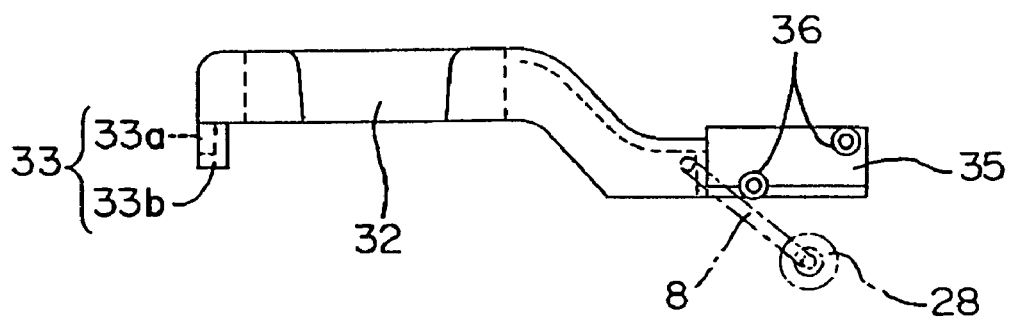
Figure 4C:
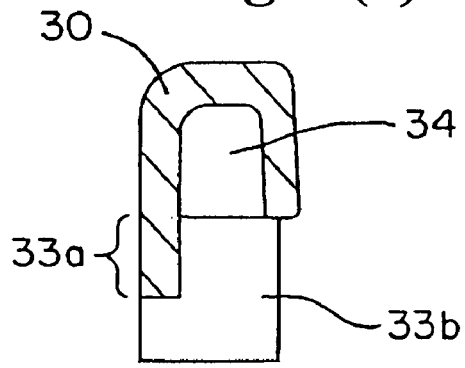
Figure 5A:
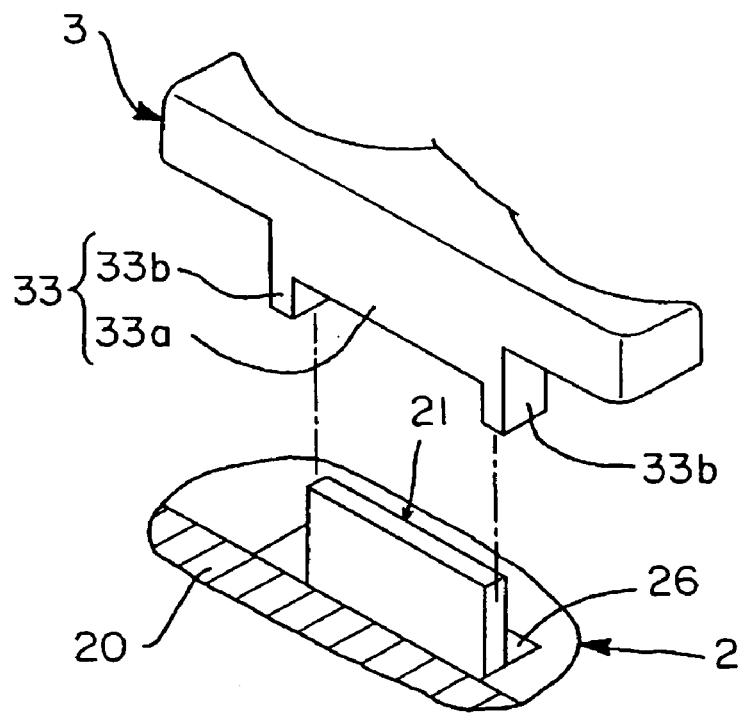
Figure 5B:
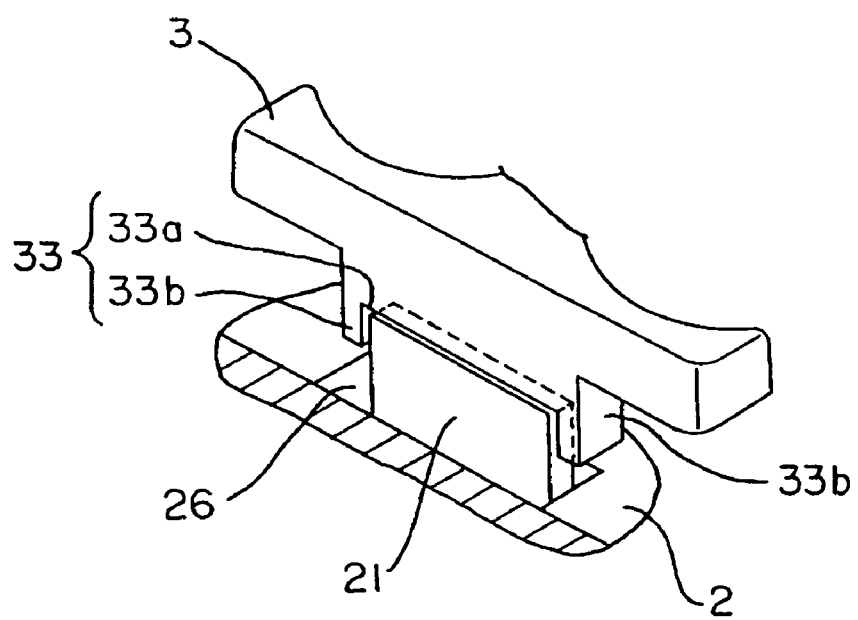
Figure 6A:
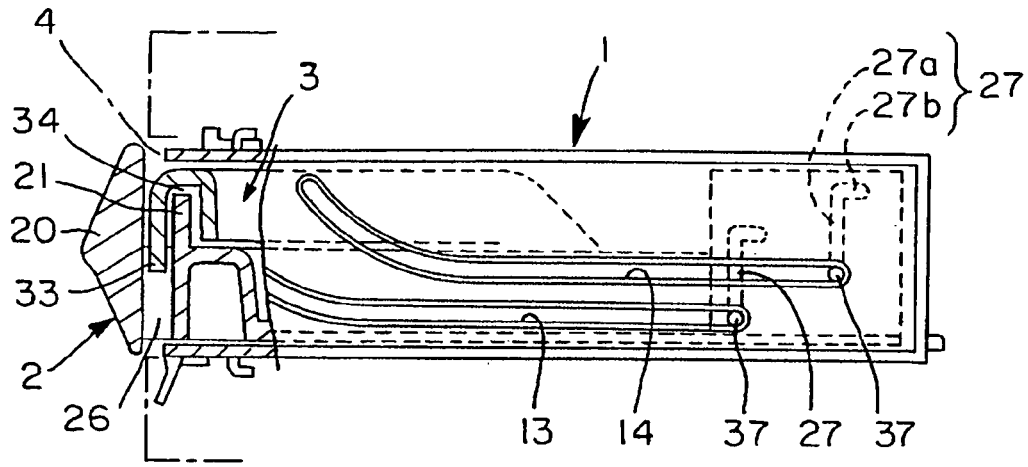
Figure 6B:
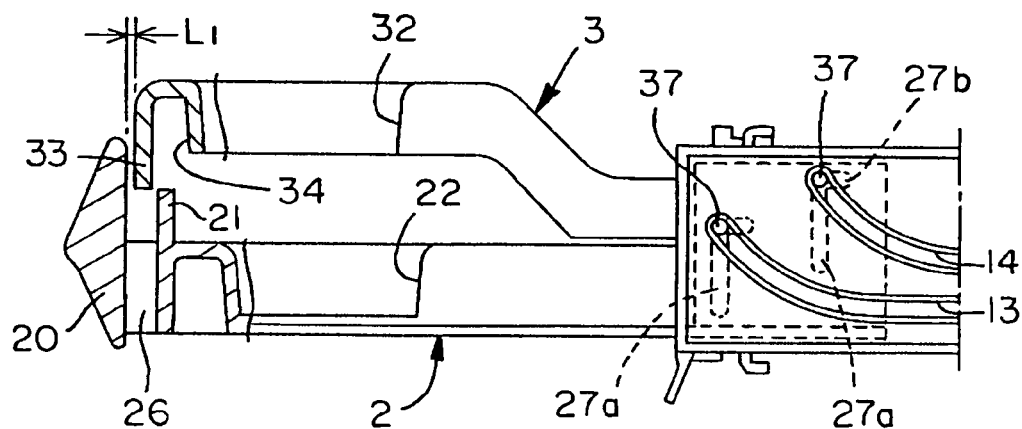
Figure 6C:
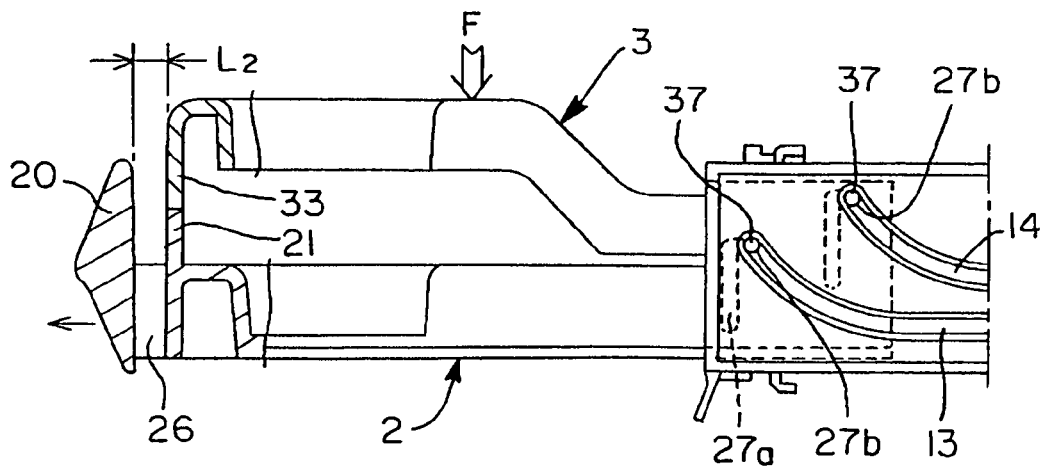
Figure 7:
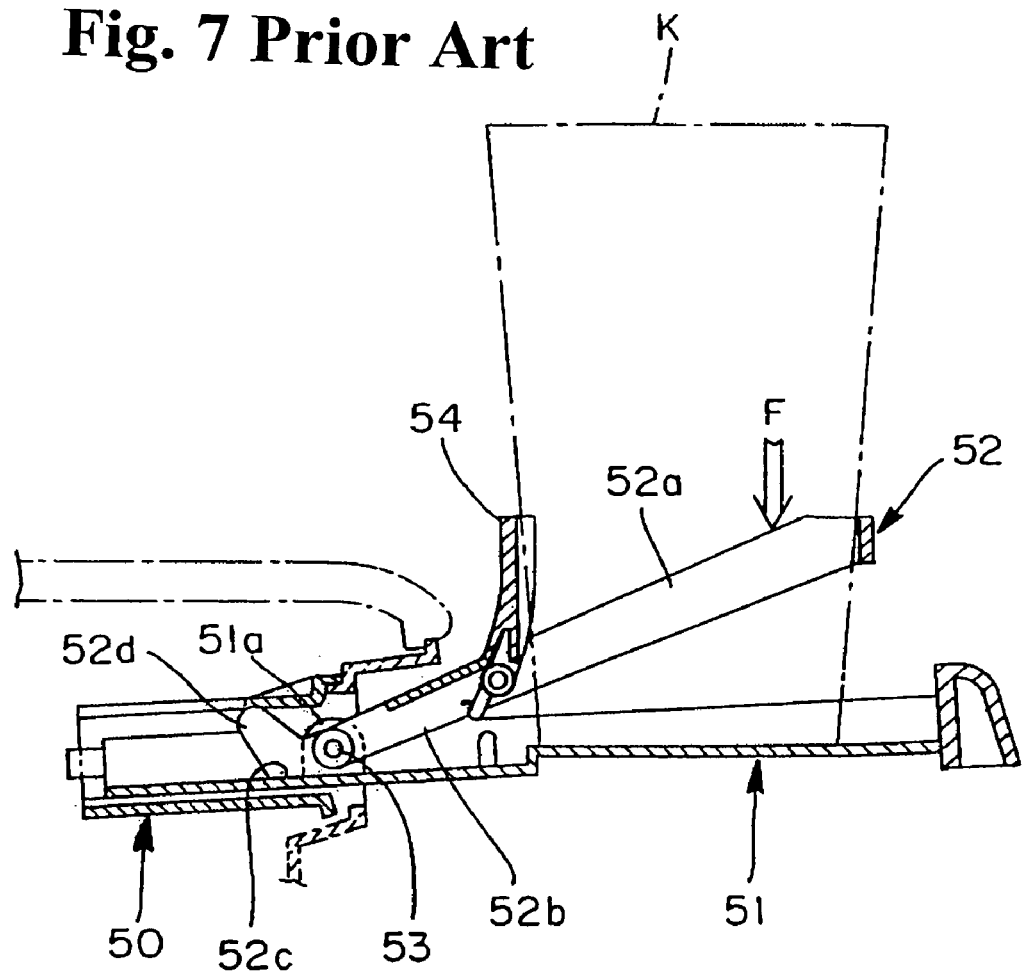
FIG. 7 is a sectional view showing a conventional cup holding device.

Hereunder, embodiments of the invention will be described with reference to the accompanying drawings. FIGS. 1 and 2 are schematic views showing a structure of a cup holding device. FIG. 3(a) is a plan view of a case; FIG. 3(b) is a plan view of the tray; and FIG. 3(c) is a side view of the tray. FIGS. 4(a) to 4(c) are views showing a detailed structure of the cup holder device, wherein FIG. 4(a) is a plan view of a holding member thereof, FIG. 4(b) is a side view of the holding member, and FIG. 4(c) is a sectional view taken along line 4(c)-4(c) in FIG. 4(a). FIGS. 5(a) and 5(b) are views showing a rib and a rib portion to be supported, wherein FIG. 5(a) is a partially exploded perspective view showing the rib formed on the tray and the rib portion to be supported formed on the holding member, and FIG. 5(b) is a partial perspective view showing a state where the rib engages the rib portion to be supported. FIGS. 6(a) to 6(c) show main movements of the cup holder device. In the following description, after a structure of the device is described in detail together with the main movements of respective members and assembly, operations of the respective members will be described.

A cup holding device according to an embodiment of the invention is formed of a storing case 1 with a front opening; a tray 2 for placing a container or the like; and a periphery holding member 3 for holding the container. All the main members are formed of a resin molded product. The tray 2 is shifted from a drawn position (the foremost position) where the tray 2 is moved forwards with respect to the case 1 to a stored position where the tray 2 is moved backwards, i.e. stored in the case 1. The holding member 3 is connected to the tray 2 to be substantially superposed thereon, so that the two members are stored in the case 1 in a non-usable position. The holding member 3 is shifted from the non-usable position stored in the case 1 to a usable position (the uppermost position) where the holding member 3 is lifted by the forward movement of the tray 2.

While the cup holding device is installed in a depressed portion 4 of an opening at a front side of an armrest or an installment panel constituting a seat as shown in FIG. 6(*a*) in a car compartment, the cup holding device may be installed in other places, such as a console.

The case 1 has a flat box shape with opened front and rear surfaces and defined by upper and lower surfaces 10 and 11 and right and left side surfaces 12. On the upper surface 10, there are provided positioning piece portions 10*a* and a spring engaging portion 10*b* provided on the front side thereof; an elongated opening 10*c* extending in the front to rear direction slightly shifted from the center of the upper surface 10; a latch tooth portion 10*d* continuously provided on one end surface of the opening 10*c* in the front to rear direction; and a trace attaching portion 10*e* and a G-sensor disposing portion 10*f* positioned on the rear side thereof.

The lower surface 11 has a widely cut portion at the intermediate portion on the rear side, and a plurality of attaching pieces 11*a* on the front side thereof. The left and right side surfaces 12 are hemmed with peripheral ribs 12*a*. Two guiding grooves 13 and 14 having the same shape in the front to rear direction and positioned on the upper and lower sides are provided inside the rib 12*a*. Each of the guiding grooves 13, 14 passes through the side surface, and includes a substantially horizontal groove from an end on the rear side to the front side, and an inclined groove toward an end on the front side. The spaces between the ends on the rear and front sides of the guiding grooves 13 and 14 are set to be the same. A projecting piece 12*b* extends in the front to rear direction in parallel to the lower surface 11 inside the side surface 12. A guiding groove 15 having a section of a substantially U-character shape is formed between the projecting piece 12*b* and the lower surface 11.

A trace member 16 is disposed on the case 1 as described above, and is rotatably supported on the attaching portion 10*e*. A G-sensor (inertia stopper) 18 is built in the disposing portion 10*f*. The trace member 16 includes a pin 17 positioned on a leading end thereof, and constitutes a push-push engaging mechanism, i.e. a locking device, together with a heart cam groove 29 (described later) on the side of the tray 2. When the tray 2 is pushed toward the rear side to the storage position, the push-push engaging mechanism engages. The push-push engaging mechanism is released from the engagement by the next pushing operation. The G-sensor 18 is provided in a state urged by a spring 19, so that the G-sensor 18 prevents the engagement from improperly being released when the tray 2 is pushed in through an inertial force due to, for example, sudden brake or collision of an automobile. Incidentally, the push-push engaging mechanism may be replaced by other locking mechanism. A unitized G-sensor disclosed in Japanese Patent Publication (Kokai) No. 2000-12481 may be employed.

The tray 2 has a plate shape capable of being pushed in or pulled out through the opening on the front side of the case 1. The tray 2 includes a covering portion 20 provided on a front end, i.e. leading end; a convex-shape supporting rib 21 vertically provided on an inner side, i.e. backside, of the covering member 20; left and right side cup receiving portions 22 disposed slightly on a backside from the supporting rib 21; and thin side hem portions 23 provided on both sides of the tray 2 to extend in the front to rear direction to be fitted to the guiding grooves 15. Also, the tray 2 includes sidewall portions 24 projecting to both sides on the backside, and an attaching pedestal 25 positioned at a substantially intermediate portion in the lateral direction on the rear side at a one-step lower portion 2*a* on the backside of the cup receiving portions 22.

The covering portion 20 has such a size covering the front opening of the case 1. The supporting rib 21 has a projecting length corresponding to the lifted height of the holding member 3, and is disposed at an intermediate portion in the lateral direction and substantially in parallel to an inner surface of the covering portion 20. The front plate portion between the supporting rib 21 and the covering portion 20, and the front plate portions positioned on both sides of the supporting rib 21 are vertically penetrated through, and a portion thereof constitutes a concave-shape lower space portion 26. The lower space portion 26 has a concave space for receiving a corresponding lower side portion of a rib portion, 33 to be supported. The cup receiving portion 22 has a concave shape for receiving therein a bottom surface of a container K, and a portion of the concave shape on the left or right side is removed so that even a container having a size larger than the concave shape can be held.

Each of escape holes 27 is formed of a vertical hole 27*a* and a horizontal hole 27*b* horizontally extending from the upper end of the vertical hole 27*a*, and two of the escape holes 27 are symmetrically provided on the left and right sidewalls 24, respectively. As shown in FIG. 3(*c*), the hole on the rear side is provided at a higher position than that on the front side with a space therebetween in the front to rear direction. A length T1 of the vertical hole 27*a* corresponds to the lifted height of the tray 2, and substantially corresponds to the space between the ends of the guiding grooves 13 and 14 as described above. The horizontal holes 27*b* allow the tray 2 to move relative to the holding member 3, and the tray 2 is independently moved forwards for a length T2.

A portion of the attaching pedestal 25 is removed at an intermediate portion thereof so that the attaching pedestal 25 is partitioned by the removed portion 25*a*. A urging device 6 is built in the removed portion 25*a*. Supporting shafts 28 for holding the spring member 8 are provided on both sides of the attaching pedestal 25. A heart cam groove 29 is disposed on an upper surface of one side of the attaching pedestal 25. A damper device 7 is attached on the upper surface of the other side thereof. The urging device 6 is a Conston spring, and is disposed in the removed portion 25*a*. The spring is pulled out from the main portion, and an end portion thereof engages or is fixed to the spring engaging portion 10*b* on a front side of the case with an appropriate device, so that the tray 2 is always urged in a direction that the tray 2 is pulled out from the case 1.

The heart cam groove 29 includes a convex-shape cam portion (substantially heart shape), and engages the pin 17 of the trace member 16. When the tray 2 is pushed with respect to the case 1 against the urging force of the urging device 6 and the pushing force is released at the storage position, the tray 2 becomes an engaged state, and the engaged state is released by the next pushing operation. When the engaged state is released, the tray 2 is automatically moved to the drawn position by the urging force of the urging device 6.

The damper device 7 is, for example, of a hydraulic type having a known rotating gear 7*a* for receiving the resistance of the hydraulic oil in the main portion. When the tray 2 is moved from the storage position to the withdrawn position by the urging force of the urging device 6 while the rotating gear 7a engages the teeth portion 10d on the case side, the tray 2 receives a braking force of the damper device 7, so that the tray 2 is moved at a substantially constant speed. The spring member 8 has a substantially U-character shape with both ends held by the corresponding supporting shafts 28, and biases the holding member 3 upwardly, as shown in FIG. 4(b).

Incidentally, the spring member 8 has an urging force considerably weaker than that of a spring member in a conventional holding member. The spring member 8 may be omitted. This is because the holding member 3 is lifted when plural shaft portions 37 (described later) are positioned at the front side terminals of the corresponding guiding grooves 13 and 14, and the lifted state is held by the horizontal holes 27b of the escape holes 27 fitting the respective shaft portions 37. In other words, the spring member 8 is provided just for facilitating to lift the holding member 3 by reducing the load resistance applied to the shaft portions 37 of the holding member 3 when the tray 2 is shifted, or for absorbing wobbling of the holding member 3.

The holding member 3 has a size to be superposed on the tray 2 with a room, and a front plate portion 30 is formed to be one step higher. The front plate portion 30 includes two holes 32 for receiving the container or the like therein and the rib portion 33 to be supported at a lower portion on the front end side. The holes 32 are disposed corresponding to the respective placing portions 22, and a portion of the fringe of each hole 32 is removed so that a container having a diameter larger than the diameter of the hole 32 can be inserted. The front side portion fringing the hole 32 in the front plate portion 30, as shown in FIG. 4(c), is formed in a U-character shape facing downwardly in section, so that the supporting rib 21 is received in an empty portion 34 of the U-character shape.

The rib portion 33 to be supported is disposed to the front sidewall portion of the U-character shape partitioning the empty portion 34, and has a size to be received on the supporting rib 21. The rib portion 33 to be supported also includes a portion 33a to abut against the supporting rib 21, and slip fault preventing portions 33b positioned on the outer sides of the corresponding side surfaces of the supporting rib 21 provided on both sides or on the left and right sides of the portion 33a and disposed slightly longer than the both sides of the portion 33a. Accordingly, the rib portion 33 to be supported is formed in a U-character shape as a whole. In the embodiment, each portion 33b has a width wider than that of the portion 33a, and the lower end of the portion 33b is inserted into the lower empty portion 26. Incidentally, the shapes of the supporting rib 21 and the rib portion 33 to be supported may be reversed. The same sub-holding member as the conventional device may be attached to an inner peripheral surface of the hole 32, if necessary.

A rear plate portion 31 includes a removed portion 31a opened forward from the rear end intermediate portion; step portions 35 lowered by one step on both sides thereof; and two pairs of shaft attaching portions 36 projecting from the end surfaces of the respective step portion 35. The removed portion 31a is a place for receiving the tray attaching pedestal 25. The respective shaft attaching portions 36 are disposed with spaces therebetween in the front to rear direction and in the vertical direction. The spaces substantially correspond to the length between the front and rear terminals among the spaces between both the guiding grooves 13 and 14.

In the present embodiment, each shaft attaching portion 36 is formed in a substantially cylindrical shape, so that the shaft portion 37 can be inserted with pressure. Incidentally, the number of the shaft portions 37 and the shaft attaching portions 36 may be larger than that described in the present embodiment, if necessary.

The respective members described above are assembled, for example, such that the holding member 3 is disposed on the tray 2, and in a state that the side edge portions 23 of the tray 2 are fitted in the guiding grooves 15 on the case and the tray 2 is inserted into the case 1 together with the holding member 3, the shaft portions 37 are attached to the shaft attaching portions 36 through the escape holes 27 from the corresponding grooves 13 and 14. As described above, the case 1, the tray 2 and the holding member 3 are connected through fitting the shaft portions 37 to the corresponding grooves 13 and 14 through the escape holes 27 to thereby obtain a completed cup holding device. Incidentally, the drawing edge portion of the Conston spring, i.e. the urging device 6, engages the spring engaging portion 10b at an early stage when the tray 2 is inserted into the case 1. The main portion of the damping device 7 is attached to the corresponding portion of the attaching pedestal 25 through the opening 10c.

The cup holding device described above is designed to obtain the following operational characteristic as compared with the conventional cup holding device. As shown in FIG. 6(a), the tray 2 is positioned in the storage position (i.e. the holding member 3 in the non-usable position) pushed in the case 1 against the urging force of the urging device 6, and engages the A push-push engaging mechanism (trace member 16 and heart cam groove 29). In the state, the respective shaft portions 37 of the holding member 3 are held under control at the rear side terminals of the guiding grooves 13 and 14 on the respective corresponding sides of the case 1 from beneath the vertical holes 37a on the side of the tray. The supporting rib 21 on the tray is positioned in the empty portion 34 in the holding member, and the lower end portion corresponding to the rib portion 33 to be supported on the holding member is positioned in the lower space portion 26 in the tray.

FIG. 6(b) shows a state where the tray 2 is pushed backwards through the cover 20 to release the engagement of the push-push engaging mechanism, and is in the middle of moving forward, i.e. toward the usable position (usable position of the holding member 3) from the storage position by the urging force of the urging device 6. In other words, the tray 2 is moved horizontally while the respective shaft portions 37 on the holding member slide through the vertical holes 27a in the tray along the guiding grooves 13 and 14 of the case 1. At that time, the respective shaft portions 37 slide obliquely and upwardly along the upwardly inclined groove at the front side of the guiding grooves 13 and 14. When the respective shaft portions 37 slide upwardly, the respective shaft portions 37 are escaped along the vertical holes 27a of the escape holes 27 in the tray to move upwardly.

As described above, in the embodiment, the tray 2 moves horizontally due to the vertical holes 27a, and the holding member 3 is switched to the uppermost position, i.e. usable position, from the non-usable position, i.e. the lowest position, in a substantially horizontal state. In this case, the holding member 3 is always held horizontally while the plural shaft portions 37 with spaces in the horizontal and vertical directions therebetween slide along the corresponding guiding grooves 13 and 14. In other words, in the structure, the holding member 3 is lifted and shifted to the usable position while the shaft portions 37 slide along the guiding grooves 13 and 14 in the case, so that the spring member 8 can be omitted. The spring member 8 is provided just for reducing the load resistance applied to the respective shaft portions 37, or for absorbing the wobbling among the respective members.

FIG. 6(c) shows a state where the tray 2 independently moves further to the drawn position from the state as shown in FIG. 6(b). In this case, the holding member 3 is fixed at the position since the shaft portions 37 are held at the front side terminals of the guiding grooves 13 and 14 in the case. The tray 2 is independently moved to the drawn position, i.e. the foremost position, by the urging force of the urging device 6 since the respective shaft portions 37 slide to the horizontal holes 27b from the vertical holes 27a of the escape holes 27. Then, the supporting rib 21 provided to the tray 2 is moved to immediate under the portion 33 to support the same. Accordingly, in the holding member 3, the shaft portions 37 on the base end side are supported by the vertical holes 27a, and the rib portion 33 to be supported abuts against the supporting rib 21 on the tray on the leading end side. Consequently, in the structure, even if an excessive downward load F is applied to the holding member 3, the holding member 3 is held horizontally, so that there is no risk that the holding member 3 improperly comes down or is damaged as in the conventional cup holding device.

The operation described above can be obtained even if the rib portion 33 to be supported is omitted. When the rib portion 33 to be supported is provided, it is possible to reduce a height of the supporting rib 21, or prevent contact among the members. Also, as shown in FIGS. 5(a) and 5(b), the leading end side of the holding member 3 is held under a state that the supporting rib 21 is disposed in the concave portion of the rib portion 33 to be supported. Accordingly, even if the holding member 3 receives a sidewise load, the holding member 3 maintains to engage the tray 2, thereby improving the holding characteristics of the container or the like.

Incidentally, when the tray 2 is shifted to the storage position, the shaft portions 37, the escape holes 27 and guiding grooves 13 and 14 are operated from the state shown in FIG. 6(b) to the state shown in FIG. 6(a). The invention can be modified based on the present embodiments in various ways. For example, the shape of the placing portion 22 on the tray and the shape of the holes 32 in the holding member may be changed, or various sub-holding members may be additionally provided on the hole 32.

As described above, in the cup holding device according to the invention, the following effects can be obtained.

According to the first aspect of the invention, without sacrificing the simple and compact structure, even if the downward load is applied to the holding member, the holding member is not improperly shifted to the non-usable position, thereby preventing damage.

According to the second aspect of the invention, the holding member can be moved for a predetermined distance with respect to the tray, so that the operational characteristics are improved, thereby making the cup holding device simple and compact, and improving the design flexibility.

While the invention has been explained with reference to the specific embodiments of the invention, the explanation is illustrative and the invention is limited only by the appended claims.

What is claimed is:

1. A cup holding device for holding a container, comprising:
   a storage case having a front opening,
   a tray slidably disposed in the storage case for placing the container, said tray being movable between a drawn position where the tray is drawn forward from the storage case through the front opening and a storage position where the tray is stored in the storage case,
   a holding member situated on the tray for holding the container and having a space at a front side thereof, said holding member being movable between a non-usable position where the holding member is retained in the tray to be held in the storage case and a usable position where the holding member rises above the tray by a forward movement of the tray, and
   a supporting rib disposed at a forward end of the tray, said supporting rib being located under a forward end of the holding member for supporting the same when the tray moves forward to the drawn position and the holding member moves to the usable position, said supporting rib being situated in the space formed in the holding member when the holding member is at the non-usable position.

2. A cup holding device according to claim 1, wherein said holding member includes a supported portion extending downwardly from a position adjacent to the space for abutting against the supporting rib.

3. A cup holding device according to claim 2, wherein one of said supporting rib and said supported portion is formed in a convex shape and the other of said supporting rib and said supported portion is formed in a concave shape for fitting in the convex shape.

4. A cup holding device for holding a container, comprising:
   a storage case having a front opening, side surfaces and guiding grooves formed in the side surfaces, each guiding groove having a horizontal groove and an upwardly curved groove at a front side thereof,
   a tray slidably disposed in the storage case for placing the container and having escape holes formed in side surfaces thereof, each escape hole having a vertical hole and a horizontal hole, said tray being movable between a drawn position where the tray is drawn forward from the storage case through the front opening and a storage position where the tray is stored in the storage case, and
   a holding member situated on the tray for holding the container, said holding member being movable between a non-usable position where the holding member is retained in the tray and a usable position where the holding member rises by a forward movement of the tray, said holding member having a plurality of shaft portions with a space therebetween on side surfaces thereof, said shaft portions being inserted into the guide grooves and the escape holes so that the shaft portions slide in the guide grooves and the escape holes when the tray moves relative to the storage case.

5. A cup holding device according to claim 4, wherein said holding member moves from the non-usable position to the usable position while the shaft portions slide along the upwardly curved grooves, and said tray moves further forward to the drawn position while the shaft portions slide along the horizontal holes after the holding member moves to the usable position.

6. A cup holding device according to claim 4, further comprising a supporting rib disposed at a forward end of the tray for supporting a forward end of the holding member when the tray moves forward to the drawn position and the holding member moves to the usable position, said supporting rib being situated in a space formed in the holding member when the holding member is at the non-usable position.

7. A cup holding device according to claim 6, wherein said holding member includes a supported portion extending downwardly from a position adjacent to the space for abutting against the supporting rib.

8. A cup holding device according to claim 7, wherein one of said supporting rib and said supported portion is formed in a convex shape and the other of said supporting rib and said supported portion is formed in a concave shape for fitting in the convex shape.

\* \* \* \* \*